United States Patent
Erichsen

(10) Patent No.: US 9,450,392 B2
(45) Date of Patent: Sep. 20, 2016

(54) METHOD FOR DETECTION OF CHARGE ORIGINATING FROM LIGHTNING

(75) Inventor: Hans Vagn Erichsen, Arhus V (DK)

(73) Assignee: Vestas Wind Systems A/S, Aarhus N. (DK)

(*) Notice: Subject to any disclaimer, the term of this patent is extended or adjusted under 35 U.S.C. 154(b) by 635 days.

(21) Appl. No.: 12/810,666

(22) PCT Filed: Dec. 22, 2008

(86) PCT No.: PCT/DK2008/000443
§ 371 (c)(1),
(2), (4) Date: Jun. 25, 2010

(87) PCT Pub. No.: WO2009/083006
PCT Pub. Date: Jul. 9, 2009

(65) Prior Publication Data
US 2010/0280797 A1    Nov. 4, 2010

(30) Foreign Application Priority Data
Dec. 28, 2007 (DK) .................................. 2007 01887

(51) Int. Cl.
*G01R 19/00* (2006.01)
*H02G 13/00* (2006.01)

(52) U.S. Cl.
CPC .............. *H02G 13/00* (2013.01); *F03D 17/00* (2016.05); *F03D 80/30* (2016.05); *H02G 13/60* (2013.01); *F05B 2260/80* (2013.01); *Y02E 10/722* (2013.01)

(58) Field of Classification Search
CPC .... G06F 17/18; F03D 11/00; F03D 11/0033; H02G 13/60; H02G 13/00; F05B 2260/80
See application file for complete search history.

(56) References Cited

U.S. PATENT DOCUMENTS

| 3,940,607 | A  |   | 2/1976 | Krider |
| 5,621,309 | A  |   | 4/1997 | Feldman |
| 2006/0126252 | A1 | * | 6/2006 | Mortensen ..................... 361/118 |
| 2010/0077850 | A1 | * | 4/2010 | Matsushita ................ 73/170.24 |

FOREIGN PATENT DOCUMENTS

| CN | 1507125 A | 6/2004 |
| CN | 1916584 A | 6/2004 |
| EP | 1 754 887 | 2/2007 |

(Continued)

OTHER PUBLICATIONS

JP 2008280940 A—Abstract—English Translation.*
JP 2008280940 A—Description—English Translation.*
Alain Rieutort; International Search Report and Written Opinion issued in priority application No. PCT/DK2008/000443; May 19, 2009; 12 pages; European Patent Office.

(Continued)

*Primary Examiner* — Patrick Assouad
*Assistant Examiner* — Haidong Zhang
(74) *Attorney, Agent, or Firm* — Patterson + Sheridan, LLP

(57) ABSTRACT

The invention relates to a detection apparatus of a wind turbine wherein said wind turbine comprises a down-conducting system arranged to conduct current induced from lightning, wherein said detection apparatus comprises a charge measurement apparatus for establishment of a charge representation, wherein said charge representation represents charge induced into said down-conducting system by lightning, and wherein said detection apparatus further comprises an estimator for estimating deterioration induced by lightning of one or more components in a wind turbine on the basis of said charge representation.

21 Claims, 8 Drawing Sheets

(56) References Cited

FOREIGN PATENT DOCUMENTS

Figure 1:
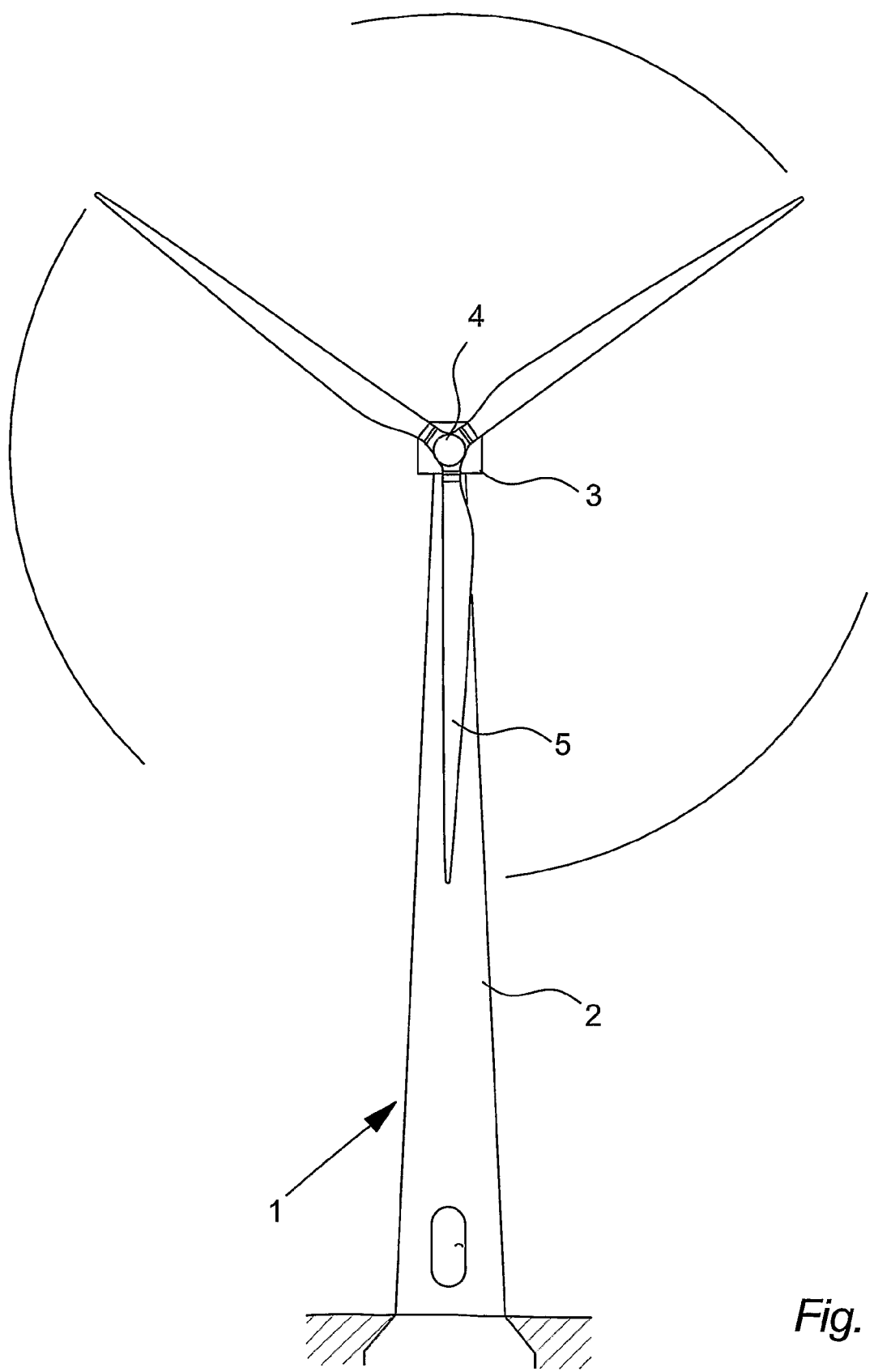

| | | | |
|---|---|---|---|
| FR | 2 848 351 | | 6/2004 |
| JP | 2006275845 | A * | 10/2006 |
| JP | 2008280940 | A * | 11/2008 |
| WO | 01/33234 | | 5/2001 |
| WO | 0133234 | A1 | 5/2001 |
| WO | 2004/111686 | | 12/2004 |

OTHER PUBLICATIONS

Search Report issued in Denmark priority application No. PA 2007 01887; Aug. 18, 2008; 1 page; Denmark Patent and Trademark Office.

Alain Rieutort; International Preliminary Report on Patentability issued in priority International Patent Application No. PCT/DK2008/000443; Jun. 29, 2010; 7 pages; European Patent Office.

* cited by examiner

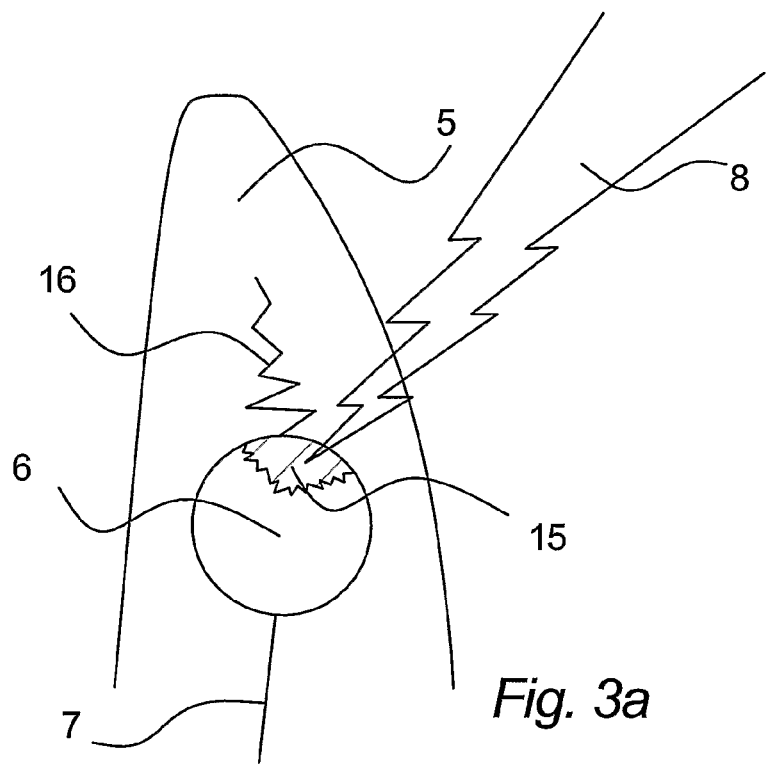
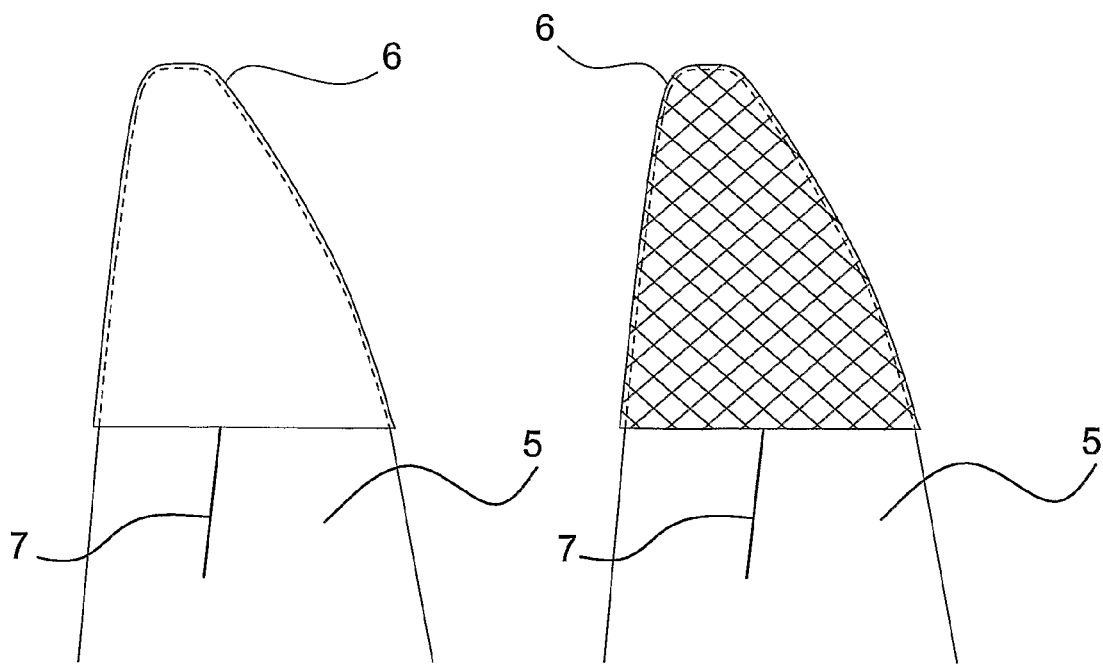
Fig. 3a
Fig. 3b
Fig. 3c

METHOD FOR DETECTION OF CHARGE ORIGINATING FROM LIGHTNING

FIELD OF THE INVENTION

The invention generally relates to detection of lightning in relation to a wind turbine.

BACKGROUND OF THE INVENTION

Damages related to strokes of lightning can lead to destruction of vital parts of at wind turbine both in large parts as e.g. blades but also in smaller electronic parts. This destruction of parts in a wind turbine can result in elevated costs throughout the lifetime of the wind turbine because of expensive maintenance of the wind turbine and loss in production of electricity.

One example of damage caused by strokes of lightning in wind turbines using receptors to receive lightning is cracks in the blade of the wind turbine around the part of the receptor which receives the energy (electric current, voltage, charge, etc.) from lightning. Another example of damage invoked may be deterioration of the receptors.

When lightning strikes in a wind turbine, current from lightning can be received by one or more receptors located on the surface of the wind turbine blade. The receptor is part of the surface of the wind turbine blade and the receptor is being destroyed bit by bit from each lightning the receptor receives. Because the receptor is part of the surface of the wind turbine blade, the missing part of the receptor can lead to cracks in the wind turbine blades.

A problem of state-of-the-art wind turbines is that the above-mentioned damages must be checked manually. This manual inspection of e.g. receptors in the surface of a blade has a tendency to be inaccurate e.g. because it is done by means of binoculars and furthermore the manual inspection is costly. Especially it raises the service cost on wind turbines located in areas with relatively many strokes of lightning as e.g. around the equator, where manual inspection of the receptors can be necessary. Moreover, as indicated above, such inspections may not necessarily result in the discovering of all faults on e.g. receptors.

SUMMARY OF THE INVENTION

The invention relates to a detection apparatus of a wind turbine
wherein said wind turbine comprises a down-conducting system,
wherein said detection apparatus comprises a charge measurement apparatus for establishment of a charge representation of charge induced into said down-conducting system by lightning and wherein said detection apparatus further comprises an estimator for estimating deterioration of one or more components in a wind turbine on the basis of said charge representation.

The term charge representation covers charge originating from lightning as well as any parameter representative of charge. A preferred way of establishing a charge representation is to measure the current and then convert the results obtained into charge.

The term components covers all parts of a wind turbine which may be damaged when a lightning strokes a wind turbine. Such parts may e.g. be receptors, down conducting systems, lightning current transfer unit, blades, insulation of electronics and cables, control electronics and power electronics or any not mentioned parts of a wind turbine The detection apparatus comprises in an embodiment of the invention an estimator for estimating the deterioration of components in the wind turbine on the basis of charge derived from e.g. a current measurement measured in a down-conducting system by means of the charge measurement apparatus. An estimator uses the measured data to predict when a component has to be replaced or maintained or to create more reliable data of the effect of lightning striking a wind turbine. The estimator may e.g. predict deterioration for components as e.g. receptor, blades, lightning current transfer unit, insulation of electronics and cables, down conducting systems, control electronics and power electronics.

The estimator and the charge measurement apparatus of the detection apparatus may advantageously share the same data processor or merged together on the same print.

The detection apparatus comprises in an advantageous embodiment of the invention a charge measurement apparatus for measuring charge originating from lightning which can be used to predict deterioration of some components in a wind turbine because deterioration of some components in a wind turbine can be derived as a function of conducted current induced by lightning. The measured data from the charge measurement apparatus can also be used for other purposes such as creating databases or statistics related lightning striking a wind turbine.

A detection apparatus is present in combination or connection with the down-conducting system and may be located inside or outside of the wind turbine. The detection apparatus comprises various components required for carrying out the specific detection task required from the detection apparatus.

When lightning strikes a wind turbine current induced by lightning has to be conducted through the wind turbine to the ground, with deterioration of components in the wind turbine as a possible consequence.

If the current is conducted through the wind turbine through a down-conducting system the deterioration may be avoided or directed to components, e.g. components of the down-conducting system, instead of components which may be very expensive or difficult to repair/replace. The down-conducting system may e.g. be designed according to conventional design principles.

In an embodiment of the invention, said one or more components forms at least a part of the down-conducting system.

In an embodiment of the invention, said one or more components comprises a receptor and/or a lightning current transfer unit.

The receptor may typically be arranged in the tip of the blade. The lightning current transfer unit may e.g. form part of the down-conducting system at positions where a transfer of lightning-induced current between mutually moving or movable parts of the wind turbine is required. According to a preferred embodiment, such lightning current transfer unit may be applied in the transition between the receptor-mounted blade and the nacelle and furthermore between the nacelle and the tower.

Evidently, further or fewer transfer units may be applied depending on the applied configuration of the down-conducting system.

In an embodiment of the invention, said estimation of deterioration of one or more components is based on an accumulation of charge established by said detection apparatus.

In an embodiment of the invention, said down-conducting system comprises at least one galvanic connection from a receptor to a ground connection.

The down-conducting system comprises at least one connection from a location at the top of the wind turbine, where a lightning may strike and down through the wind turbine to a ground connection which conducts current induced by lightning to ground.

The down-conducting system may comprise different parts of the wind turbine. Non-limiting examples of different parts may e.g. be receptors, wire or bar in the blade, lightning current transfer units between blade and hub, joining means in the hub or nacelle, wire or bar down through the tower and a bar or plate as ground connection.

The individual construction parts of the wind turbine may be used as part of the down-conducting system. Non-limiting examples may be built in metal reinforcement in a blade, a metal tower or foundation of the wind turbine, etc.

Part of the down-conducting system may in a preferred embodiment of the invention be rotating.

The down-conducting system may be formed, at least partly inside the wind turbine to obtain a better protection from the environment in which the wind turbine is located.

The down-conducting system may be fed at least partly outside the wind turbine to obtain a better insulation from the sensitive electronics inside the wind turbine.

The down-conducting system comprises joining means e.g. close to the root of the blades, inside the hub between the nacelle and the tower. The joining means joins the part of the down-conducting system from each blade of the wind turbine in a galvanic connection.

The joining means may also be referred to as a lightning current transfer unit.

The galvanic connection comprises in an advantageous embodiment of the invention at least partly an electrically conducting material.

The galvanic connection may comprise a conductive material, preferably a conductive metal, to lower the electrical resistance so that the current induced by lightning is guided through the intended connection to the ground connection and not e.g. the individual construction parts of the wind turbine.

The electrically conductive material comprises in an advantageous embodiment of the invention at least partly one metal selected from the group of conductive metals Cu, Fe, Al, Ag, Au, Ni, Pb, Sn, Hg or alloys or any combination thereof.

The conductive material is from the group of metals with good conductance so that the electric resistance in the connective wire will be as low as possible. In an embodiment of the invention, said at least one receptor is located at the upper end of the wind turbine.

The term upper end of the wind turbine covers a receptor located on the tower or at a pole at the tower, on the nacelle or at a pole at the nacelle or at one or more of the blades of the wind turbine or any combination thereof.

More than one receptor may be located at different locations at the wind turbine, these locations include the nacelle or any kind of poles in connection thereto, blades or tower or any combination thereof.

The at least one receptor is in an advantageous embodiment of the invention located at the surface of each blade of the wind turbine.

If more than one receptor is located at each blade of the wind turbine, this may increase the possibility that one or more strokes of lightning are received at a receptor and not elsewhere at the wind turbine.

The receptor may be incorporated so that the receptor is part of the surface of the blade of the wind turbine.

The at least one receptor on each blade may be located in the vicinity of the tip of each blade to secure that a receptor is always at the top of the wind turbine, which increases the possibility that lightning strikes at a receptor and not elsewhere at the wind turbine.

The at least one receptor is in an advantageous embodiment of the invention located on each side of the blade.

In an embodiment of the invention, said charge measurement apparatus is coupled to said down-conducting system.

The charge measurement apparatus may be connected to the down-conducting system by means of an optical measurement apparatus, a Rogowski coil or other measurement apparatus or any combination thereof to obtain the best possible measurement.

One or more charge measurement apparatus may preferably be located e.g. inside one or more of the blades, typically near the root of the blade.

Alternative positions of the charge measurement apparatus may also be applied within the scope of the invention, e.g. in the hub, in the nacelle or anywhere in the tower. The most optimal place in a wind turbine to place the charge measurement apparatus depends on the type of wind turbine wherein the charge measurement apparatus is to be used.

For most types of wind turbines the most optimal place in the wind turbine to place the charge measurement apparatus is presently at the root of the blade which allows individual measurements of charge in relation to each blade.

The charge measurement apparatus may be located in the lower part of the tower of the wind turbine. The charge measurement apparatus is not limited to be located at this location. It should, however, be noted that alternative positioning preferably should be configured to enable individual measurements of the receptors or at least to be able to locate the blade in which the lightning stroke.

In an embodiment of the invention, said charge measurement apparatus measures the current fed through said down-conducting system as a result of lightning.

The presently preferred charge representation may be obtained by means of an electrical measurement which is subsequently converted to a charge representation by the measurement apparatus or other suitable data-processing equipment, such as an estimator communicating with the measurement apparatus.

The charge measurement apparatus measures the current in the down-conducting system, e.g. current induced by lightning.

In an embodiment of the invention, said charge measurement apparatus comprises at least one optical measurement apparatus.

In one advantageous embodiment of the invention, the charge measurement apparatus is based on Faraday rotations which allows establishing charge.

In an embodiment of the invention, said charge measurement apparatus comprises at least one Rogowski coil.

The charge measurement apparatus is based on the principle of the Rogowski coil which allows measuring of the current induced by lightning by surrounding the down-conducting system by a coil and thereby not needing any galvanic connection between the down-conducting system and the charge measurement apparatus.

In an embodiment of the invention, the measurement apparatus is arranged at least partly in the blade.

In an embodiment of the invention, the measurement apparatus is arranged to be comprised at least partly in each blade of the wind turbine.

In an embodiment of the invention, said estimator comprises means for data processing, treatment of analogue or digital measure results, storing, displaying, interfacing and/or any combination thereof.

Components of the estimator may e.g. comprise means for data processing or treatment of analogue measure results, means for storing, means for comparing, means for displaying, means for communication and other components required to comply with requirements for the charge measurement system.

The estimator may comprise different components and may be housed in the same housing as the detection apparatus.

The estimator can be located outside the housing of the detection apparatus, e.g. in the tower, blade, nacelle or outside the wind turbine.

In an advantageous embodiment of the invention said estimator is estimating service life of components in a wind turbine.

The estimator can predict if a component in a wind turbine has to be replaced or maintained, based on the amount of charge conducted through the down-conducting system.

In an embodiment of the invention, said storing means stores or accumulates at least some of said measured data from said charge measurement apparatus.

The storing means may comprise a data-processing unit and store measured data for further data processing. The further data processing can e.g. help to predict different events in the wind turbine and create statistics of e.g. frequency of lightning strikes the wind turbine and/or simply save data for future use.

When lightning strikes the wind turbine the first time, the measured current induced by lightning is stored in data storage. When lightning strikes the wind turbine a second time, the determined charge is added to the data stored from the first stroke of lightning. This allows accumulating measured data for more than one stroke of lightning to the wind turbine. In this way the means for communication may send out a warning message of critical condition of components in the wind turbine.

The storing means may comprise a data processing unit which may be housed in the same housing as the detection apparatus.

The storing means comprises data storage of predefined critical deterioration values of at least one component in connection with the wind turbine.

In an embodiment of the invention, said accumulated data is compared with said predefined critical deterioration values of the component in connection with the wind turbine to indicate at least two maintenance levels of the component in connection with the wind turbine.

The comparing means determines on the basis of predefined and measured values the state of a component in the wind turbine.

The state of the components in the wind turbine may be defined by different maintenance levels. The maintenance levels may be defined by the amount of charge a component e.g. a receptor can conduct before it breaks or destroys itself or other components in the wind turbine.

An example of three maintenance levels may be divided as follows:
one level indicating non critical condition of components, a second level indicating critical condition of components, a third level indicating maintenance or replacement of components.

In an embodiment of the invention, said display means is capable of displaying all data handled by said detection apparatus and said charge measurement apparatus.

The display means is e.g. displaying results of the comparison of measured data and predefined data, stored data, warnings, graphic user interface and other data required to be displayed.

It is very advantageous to have display means in the situation where a field engineer is at the site of the wind turbine in other business. The display means is then a quick indicator of whether any components need to be maintained or replaced.

The detection apparatus comprises means for interfacing with other internal or external data processing units, controllers, computers, etc.

The means for interfacing can be used to communicate measured data in a wind turbine or wind power plant if e.g. the wind turbine or wind power plant comprises more than one charge measure apparatus.

The means for interfacing can also be used if e.g. the data storage is not located in the same housing as the charge measuring apparatus. Then the measured data can be sent to the data storage from the charge measure apparatus.

The means for interfacing in connection with charge measurement apparatus or data storage makes it possible to send measured data to a central data processing unit located in the wind power park, at a central location among a plurality of wind power parks or in a central maintenance building, e.g. at another location.

In an embodiment of the invention, the means for interfacing communicates the condition of at least one component in connection with the wind turbine to a central data processing device.

In an advantageous embodiment of the invention, the central data processing device can e.g. be a computer system located in a monitoring office where the means for interfacing communicates the condition of components in the wind turbine, e.g. at a predefined time or if a person in the monitoring office asks for this knowledge. This is very advantageous because a field engineer does not have to go to maintain a wind turbine unless some components have to be maintained.

The communication between the interfacing means and other internal or external interfaces may advantageously be wireless or implemented by galvanic or optical cables.

The invention relates to a method for establishing deterioration of a component of a wind turbine or a wind turbine power plant comprising the steps of measuring the charge induced into a component by lightning, establishing an accumulation of the measured charge and relating the accumulation of charge to a degree of deterioration of said component.

Moreover, the invention relates to a method implemented in a detection apparatus according to any of the claims.

The invention relates to a system comprising at least two wind turbines, each of the wind turbines comprising a detection apparatus.

In an embodiment of the invention a preferred way of establishing a charge representation is to measure the current and then convert the results obtained into charge.

Moreover, the invention relates to a wind turbine comprising a detection apparatus according to any of the claims.

THE DRAWINGS

Figure 2:
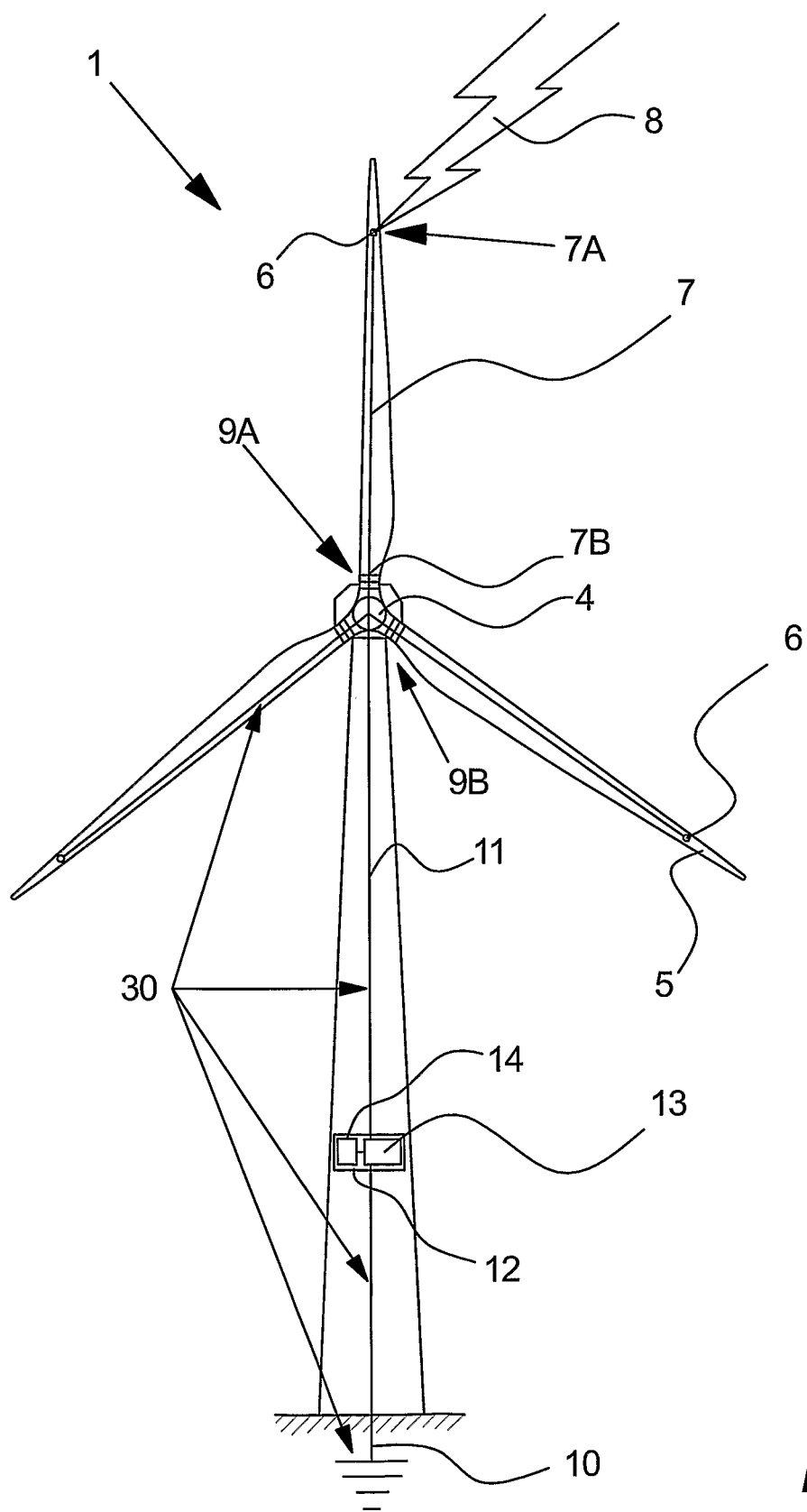
Figure 3D:
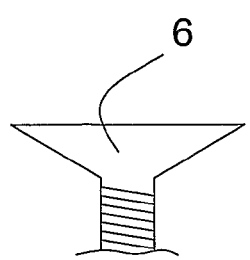
Figure 3E:
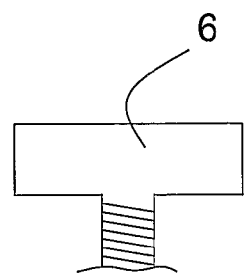
Figure 3F:
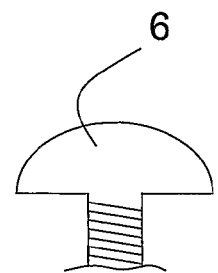
Figure 4:
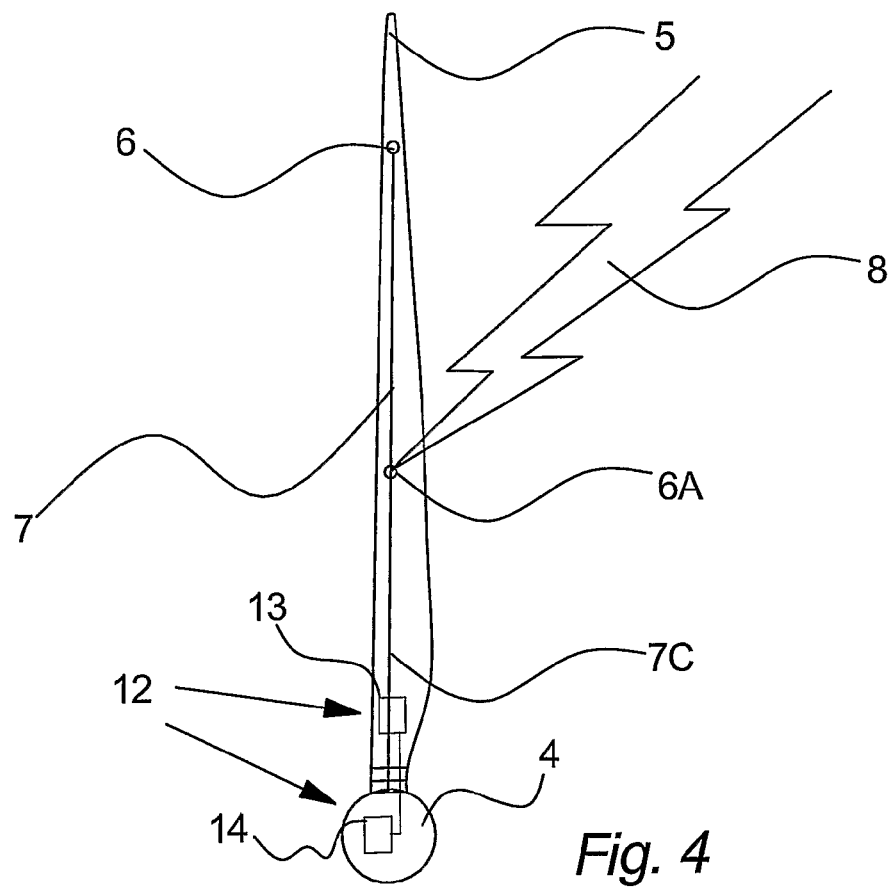
Figures 5, 6:
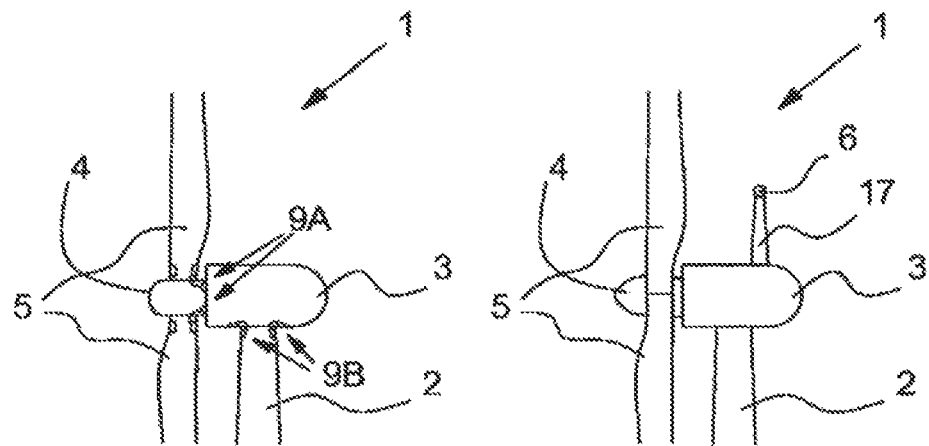
Figure 7:
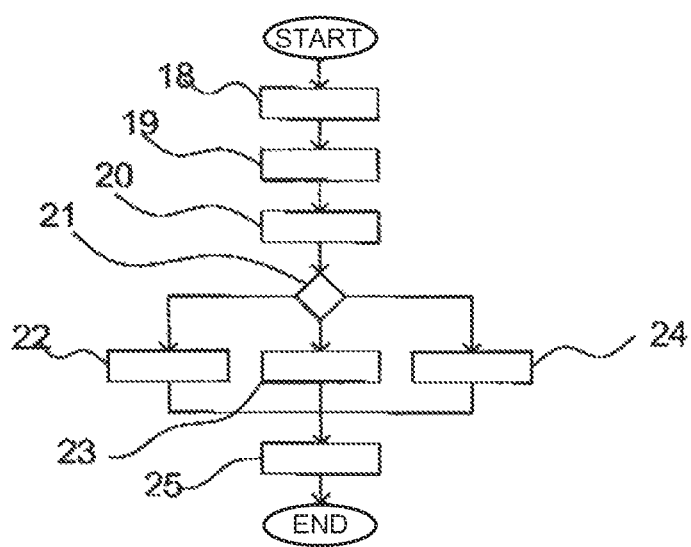
Figure 8:
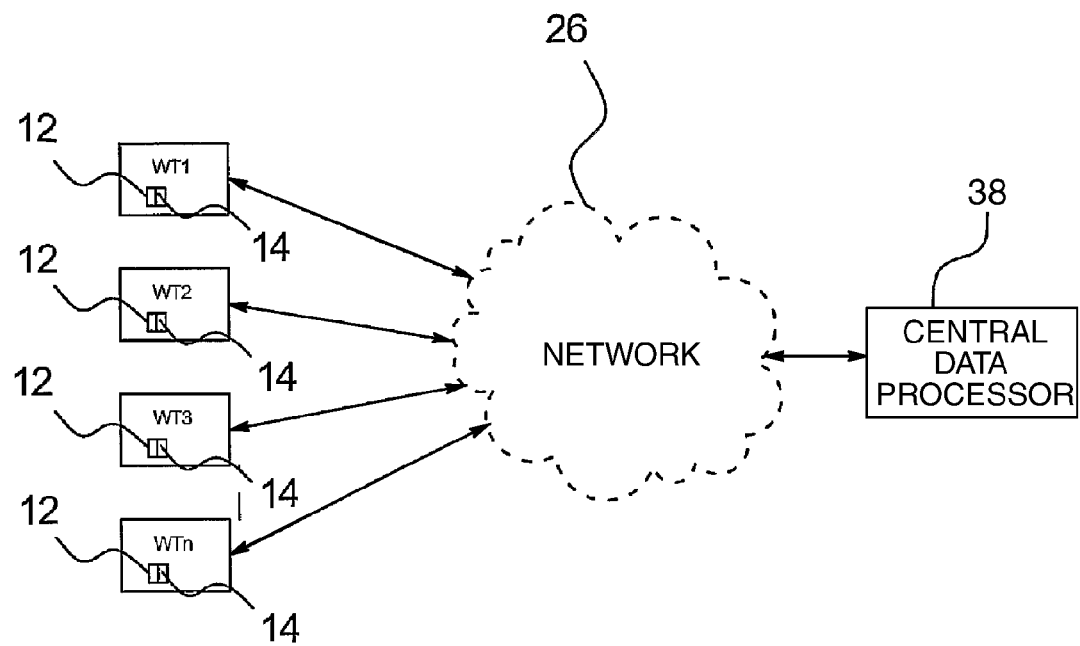
Figure 9:
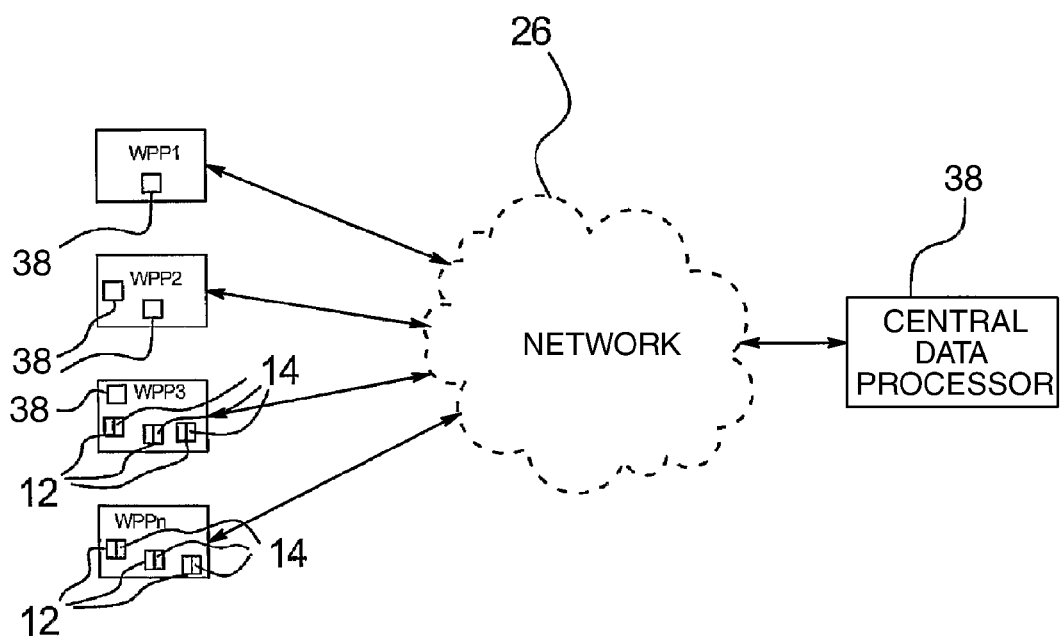

The invention will be described in the following with reference to the figures in which FIG. 1 illustrates a front view of a large modern wind turbine, FIG. 2 illustrates a front view of a wind turbine according to an embodiment of the invention, FIG. 3a-c illustrates different types of receptors on a blade of a wind turbine, FIG. 3d-f illustrates a cross sectional view of a receptor of the type illustrated in FIG. 3a, FIG. 4 illustrates a blade of a wind turbine comprising more than one receptor and with a measuring apparatus positioned according to a preferred embodiment of the invention, FIG. 5 illustrates a wind turbine from a side view, illustrating two lightning current transfer units according to an embodiment of the invention, FIG. 6 illustrates a wind turbine from a side view, with a receptor located on a pole on the nacelle according to an embodiment of the invention, FIG. 7 illustrates a flow diagram of events happening when lightning strikes in a wind turbine according to an embodiment of the invention, FIG. 8 illustrates a block diagram of the communication between pluralities of wind turbines over a network to a central data processing unit, FIG. 9 illustrates a block diagram of the communication between a plurality of wind power parks over a network to a central data processing unit, FIGS. 10A and B illustrates elements of a receptor and where FIG. 11A-G illustrates in cross-sectional view, a number of embodiments of receptors where the exterior surface is provided with one or more field enhancing protrusions.

DETAILED DESCRIPTION

FIG. 1 illustrates a modern wind turbine 1. The wind turbine 1 comprises a tower 2 positioned on a foundation. A wind turbine nacelle 3 with a generator is placed on top of the tower 2 by means of yaw bearings.

A shaft extends out of the nacelle front and is connected with a wind turbine rotor through a wind turbine hub 4. The wind turbine rotor comprises at least one rotor blade, e.g. three rotor blades 5 as illustrated.

FIG. 2 illustrates a wind turbine 1 with three rotor blades 5 and one receptor 6 on each of the rotor blades 5.

Each of the rotor blades comprises a down-conductor 7 electrically connected at a first end 7A to a receptor and at a second end 7B to a first lightning current transfer unit 9A. The down-conductor may e.g. be formed by a wire.

The first Lightning Current Transfer Unit 9A is again electrically connected to ground 10 via the nacelle, a second lightning current transfer unit 9B and a Protective Earth-wire 11 (Protective Earth-wire; PE-wire). The connection from the blades to the nacelle via the lightning current transfer unit is preferably applied to avoid that the main shaft is not forming a part of the down-conduction system.

According to an alternative embodiment of the invention, the hub may form part of the down-conducting system.

The above-mentioned down-conductor 7, the first lightning current transfer unit 9A, the second lightning current transfer unit 9B and PE-wire 11—optionally in parallel with a galvanic conductive tower—are connected to form a galvanic connection through which current induced by lightning may be led to ground 10 and this connection will in the following be referred to a down-conducting system 30. The purpose of this down-conducting system is to bypass current induced by lightning to a ground connection 10 with a minimized risk of damages to components of the wind turbine.

The PE-wire 11 may e.g. comprise a protection earth cable.

It should be noted that the part of the down-conducting system leading from the nacelle down to ground may preferable be formed e.g. by the mentioned PE-wire together with the tower of the nacelle if a conductive tower is applied. The basic point is that there needs to be a connection from the nacelle to ground. This connection may obviously be formed by other configurations of conductors and/or wires.

A down-conducting system may typically include the receptor(s) 6.

It is noted that some of the connections of the down-conducting system 30, e.g. the PE-wire 11, may be shared by different down-conducting systems, e.g. the three illustrated systems, if so desired. Other configurations and types of conductors used in the configuration are possible within the scope of the invention. Thus, wires may e.g. be exchanged by solid leads and other suitable alternatives.

The down-conducting system 30 may be terminated in a ground connection 10 which may be implemented as a spear or bar conducting the current originating from lightning into the ground. This implementation may especially be advantageous at locations where the subsoil makes it possible to pound or dig the spear or bar sufficiently deep into the subsoil.

The down-conducting system 30 may also be terminated in a ground connection implemented as a web or a plate. This may especially be advantageous at locations where the subsoil is very hard, e.g. consists of rocks, where the plate does not have to go as far down into the subsoil as the spear or bar.

The ground connection 10 may be implemented as part of the foundation of the wind turbine or may be carried out as a combination of the mentioned solutions. The illustrated embodiment of the invention furthermore comprises a detection apparatus 12 which again comprises a charge measurement apparatus 13 and a deterioration estimator 14.

In a preferred embodiment of the invention, the detection apparatus 12 is an apparatus comprising circuitry and units required for carrying out the measurement of current induced by lightning 8 and fed through the down-conducting system 30 and further data-processing of the measured data or treatment of analogue measure results. The detection apparatus 12 may moreover comprise displays, printout facilities, communication interfaces, etc.

The estimator 14 of the detection apparatus 12 may e.g. comprise means for data processing or treatment of analogue measure results, data storing arrangement, means for comparing, one or more displays, communication circuitry and other components required to comply with requirements for the charge measurement system.

A plurality of charge measurement apparatus 13 may be used if desired.

The charge measurement apparatus 13 is basically used to establish different electric measures directly representing or derived from lightning striking a wind turbine. These electric measures may e.g. be current, and from this the charge induced and originating from lightning can be derived. The detection apparatus 12 comprises a charge measurement apparatus 13 measuring current induced by lightning in the down-conducting system 30 and then transmitting the measured data to the estimator 14 in the detection apparatus 12 which, in the present embodiment, processes the measured data dependent on requirements to the system into the desired accumulated charge representation.

The estimator 14 in the detection apparatus 12 may comprise or communicate with a storing device where the measured data are stored, a data processing unit which adds new measurements to already stored measurements from past lightning strikes and then stores the accumulated data, a data processing unit which compares the accumulated data with predefined data representing the amount of charge that a component in a wind turbine, e.g. a receptor 6, can resist before it has to be replaced, and one or more display(s) to display e.g. the condition of components in the wind turbine, e.g. a receptor, accumulated data, estimated time to replacement of components in the wind turbine 1 or other data required to be displayed by the system.

Several different variants of estimation algorithms may be applied in relation to an estimator according to the invention as long as the injected charge related to a certain component of the wind turbine is captured to establish a charge history applicable for establishment of an accumulation of relevant charge. This accumulated charge may be applied directly or be processed further for the purpose of establishing a deterioration estimate related to a specified component of the wind turbine or a component related thereto. The algorithms referred to as accumulative may e.g. include integration on a continuous basis, summing of discrete measures and the algorithms may of course comprise other relevant processing operations.

Moreover, this estimate may be applied for the purpose of real-time monitoring the state of the wind turbine and relevant components thereof and moreover it may be applied for the purpose of establishing a prediction in relation to the components' life-time, requirement for maintenance etc. This monitoring may be performed remote or on-site.

The state of the components in the wind turbine may be defined by different maintenance levels. The maintenance levels may be defined by the amount of charge that a component, e.g. a receptor can be subjected to before the deterioration induced due to lightning will lead to damages of e.g. the receptor or the surrounding blade. The maintenance level may e.g. comprise a simple accumulative measure of charge representing the degree of deterioration.

The maintenance level of one type of receptor is listed below:

| | |
|---|---|
| 500 C | Requires no action |
| 1000 C | Requires maintenance within one year |
| 1500 C | Requires maintenance within one month |

The mentioned maintenance level may vary. The level which triggers actions such as maintenance, may be determined e.g. by the type of receptor, the owner of the wind turbine, service agreement, geographical location (some areas are more exposed to lightning than other), etc.

It may be advantageous to have different maintenance levels for components in a wind turbine; this allows a degree of gathering maintenance jobs in a wind turbine or wind power plant. If a field engineer has to replace a receptor in one wind turbine and a receptor in another wind turbine has reached the second level at 1000C, it is time saving to replace this receptor at the same time.

As mentioned above, the estimator 14 may include data storage(s), signal processor(s), display means and communication interface(s) in several housings or one shared housing.

The estimator 14 stores and accumulates charge and compares the measured data with pre-stored critical deterioration data for components, e.g. a receptor, in the wind turbine. In this way the estimator may calculate when e.g. a receptor is deteriorated in a degree that it has to be maintained or replaced. This can be done by displaying a warning on the display means or by sending a message to a central data processing unit located in the wind power park or e.g. in a service central at another location.

The detection apparatus 12 may be coupled to the down-conducting system and may be located anywhere in the wind turbine 1, e.g. in the nacelle 3, blade 5, hub 4 or, as in a preferred embodiment of the invention, in the tower 2 where it is easy to access. The detection apparatus 12 comprises more than one charge measurement apparatus 13 and, if required, more estimators 14. The estimator 14 may e.g. comprise any desired and/or required units, such as data processors, storages, communication interfaces, GUI's (GUI; Graphic User Interface) such as e.g. a display, keyboard, pointer means, or any combination thereof.

The detection apparatus 12 may be located within the same housing as the charge measurement apparatus 13 but this is not always an advantage. Some of the components of the estimator 14 can be shared with other parts of the control system of the wind turbine 1.

One example is the storing and/or displaying means, if these means are already implemented in e.g. the central control and available for this purpose.

The charge measurement apparatus 13 may preferably be located in a blade 5.

All the required components of the detection apparatus 12 may be housed within the same housing. This would allow prefabricated detection apparatuses and ease installing the detection apparatus 12 in the wind turbine because no large means for interfacing is needed between the individual components within the housing of the detection apparatus which makes installation faster. When all components of the detection apparatus is housed in the same housing it also eases service of the detection apparatus because all components are accessible from the same location.

All the required components of the detection apparatus may be distributed and not within the same housing.

This also allows sharing of components in the detection apparatus 12 with other parts of the wind turbine. One not limiting example could be a communication unit used by e.g. one of the controllers controlling different parts of the wind turbine.

FIG. 3*a-c* illustrates a close view of different types of receptors 6 located on or at the tip of a blade 5, e.g. the blade of FIG. 2 with the down-conductor 7 leading the current induced by lightning towards the ground connection 10.

FIG. 3*a* illustrates the receptor 6 as integrated in the blade 5 such that the receptor 6 comprises part of the surface of the blade 5. On FIG. 3*a* a part 15 is illustrated where the surface of the receptor 6 is deteriorated by a lightning 8. If no action is taken to repair or change the receptor, the missing part 15 of the surface of the receptor 6 can lead to one or more cracks 16 in the surface of the blade 5. The estimator 14 of FIG. 2 may then establish a representation of this deterioration on the basis of charge determination and accumulation thereof and avoid e.g. more complex investigations, such as visual inspection, etc. The missing part 15 may e.g. be depressions in the receptor 6 formed, by means of the force from the attack of a lightning 8 which may melt or evaporate part of the receptor 6.

According to a further, not limiting, embodiment of the invention alternative receptors 6, such as those illustrated on FIGS. 3b and 3c, may be used. The receptors illustrated on FIGS. 3b and 3c is formed in such way that the tip of the blade 5 is covered by a cap, made of a conductive material, preferably a metal. Metal such as copper or aluminum is preferred because of their high conductance, but of course other materials such as carbon could also be used.

The embodiment illustrated on FIG. 3b illustrates the cap as a closed cap and the embodiment illustrated on FIG. 3c illustrates the cap as a mesh. It should be noted that almost any design of such cap would have the effect of a receptor as illustrated in FIG. 3a.

FIGS. 3d-3f illustrate different designs of the receptor 6 illustrated in FIG. 3a, in a cross sectional view. Of course, these three designs are not limiting for the design of the receptor 6.

In a preferred embodiment the receptor 6 is equipped with a thread 27 which facilitates a connection between the receptor 6 and the down-conductor 7. In a preferred embodiment of the invention the receptor 6 is screwed into a bed which is galvanic connected the down-conductor 7.

The amount of deterioration of the receptor 6 depends on the amount of charge in the lightning 8. Hence if the charge is measured during a period of time and then integrated the result (the area under the charge curve) is the amount of charge in the lightning.

Different receptors may withstand different amount of charge before they are damaged in a way which requires maintenance. Therefore each type of receptor 6 may be tested in laboratories to find out the amount of charge they can withstand. As an alternative hereto the amount of charge which a receptor may withstand is deduced from experience or common general knowledge of the skilled person.

The result of the above mentioned integral is then compared to the amount of charge which the receptor can withstand and the result of this comparison determines how damaged the receptor is.

The integral calculation, (and accumulation of the result of more than one integral calculation) and comparison may be done in the detection apparatus 12.

FIG. 4 illustrates a further embodiment of the invention where a blade 5 of a wind turbine 1 comprises two receptors 6 and 6A combined with the down-conductor 7. The receptors 6 and 6A are both connected to and forming part of a down-conducting system 30 and located as described above as an integrated part of the surface of the blade 5.

The receptor 6A is combined with the rest of the down-conducting system 30 by means of a part 7C of the down-conductor 7.

When lightning 8 strikes, the current induced by the lightning 8 is received by one of the receptors 6 or 6A and conducted via the down-conducting system 30 to the ground.

Moreover, the embodiment includes a preferred arrangement of a detection apparatus, namely where a charge measurement apparatus 13 is positioned in the blade, near the root and where an estimator 14 is positioned in the hub 4.

In this embodiment, the charge measurement apparatus 13 comprises a number of measuring units, one located in each blade (not shown) in order to facilitate individual measurement in relation to each blade. The measurements are then communicated to the estimator 14 in the hub, and the estimator 14 therefore gathers and handles the measurements from all the measuring units, e.g. three if the wind turbine is three-bladed.

Again, it should be noted that the configuration and positioning of the components may be chosen to fit the requirements and may vary within the scope of the invention.

Moreover, different parts of the detection system may communicate by means of wired or wireless connections.

FIG. 4 illustrates how two receptors 6 and 6A can be located on a blade 5, but other possible numbers of receptors 6 and locations on the blade 5 can be chosen e.g. closer to or at the tip of the blade 5, closer to or at the root of the blade 5 or any location there between. A receptor 6 may also be located at one side of the blade 5 while another receptor 6 is located at the other side of the same blade 5.

In an embodiment of the invention, a detection apparatus 12 (not shown) or at least some of the elements of a detection apparatus 12 (not shown) may be located close to and connected to the down-conductor.

In an alternative embodiment of the invention, each receptor on the wind turbine is connected to a detector. Hence it is possible to detect which receptor of the wind turbine which has been subject to a lightning. If each receptor is provided with such detector, this detector may be connected wireless or be means of cable to a detection apparatus 12 placed e.g. in the tower. In this way, it may be possible to avoid charge measurements performed in the blade as charge may be measured in relation to a common shared part of the down-conducting system.

As mentioned above, the detection apparatus 12 may be located in the root of each of the blades 5 of the wind turbine according to a preferred embodiment of the invention.

FIG. 5 illustrates the at least two lightning current transfer units 9A and 9B which are part of the down-conductor system 30. The first lightning current transfer unit 9A comprises a sliding galvanic connection between the blade 5 near the root-end and the nacelle and may comprise a ring in the root of the blade 5 and collector shoe at the nacelle creating a sliding galvanic connection between the blade 5 and the nacelle. This mechanism has the advantageous feature that no matter at which pitch angle the blade 5 is located there is always galvanic connection between the blade 5 and nacelle. The lightning current transfer unit 9A is not illustrated in details in this figure.

The second lightning current transfer unit 9B comprises a sliding galvanic connection between the nacelle near the bottom of the nacelle to the tower by establishing a sliding galvanic connection between the nacelle and the tower, allowing galvanic connection even when the yaw bearing turns the nacelle. The lightning current transfer unit 9B is not illustrated in details in this figure. FIG. 6 illustrates another embodiment of the invention where a wind turbine 1 is illustrated from at side view, with the nacelle 3 on top of the tower 2. In this embodiment, the at least one receptor 6 is placed on a pole or bar 17 to arrange the receptor 6 higher than the nacelle 3 and higher than the receptor 6 illustrated in FIG. 5.

One or more receptors may be located in connection with the nacelle 3 and combined with a further receptor(s) 6 located in the blade 5. Current induced by lightning is conducted through the blade 5 by a part of the down-conducting system 30, down to the root of the blade 5 where the current is conducted to a joining arrangement in the hub 4 by means of a lightning current transfer unit 9.

The one or more receptor(s) 6 located at or in connection with the nacelle is connected directly or via suitable arrangements to the PE-wire 11 which conducts the current induced by lightning down into the ground by means of the ground connection 10.

FIG. 7 illustrates a flow diagram illustrating an embodiment of the invention.

When lightning strikes a wind turbine in step 18, current induced by lightning is lead through the down-conducting system 30 to the ground connection. On its way to the ground, the current induced by lightning is measured in step 19 by the charge measurement apparatus. The amount of charge measured is accumulated in step 20 by the estimator over time. The accumulated charge representation induced by lightning is then compared in step 21 with pre-stored critical deteriorative values of components, e.g. a receptor in a wind turbine.

Depending on the amount of the accumulated charge induced by lightning, an action 22, 23 or 24 is chosen e.g. according to the above-described predefined measurement levels and in step 25 sent to a central data processing unit. The different measurement levels describe the condition of components, e.g. a receptor in the wind turbine. If a critical measurement level is reached, the central data processing unit communicates that maintenance is required at the wind turbine. An action may thus be established as e.g. immediate requests, predictive requests or "no-action-required".

The flow diagram illustrated on FIG. 7 illustrates one embodiment of the invention where three measurement levels are dedicated to certain actions. In other embodiments of the invention a different number of measurement levels and associated actions may be applied. Different measurement levels may be required for different components in the wind turbine and consequently the number of measurement levels are depending on the requirements of the chosen measurement system.

FIG. 8 illustrates a block diagram of communication between pluralities of wind turbines, e.g. wind turbines in a wind power park or stand-alone wind turbines, over a network 26 to a central data processing unit 38. Each single wind turbine WT1, WT2, WT3, . . . WTn has a detection apparatus 12 installed to measure current induced by lightning striking the wind turbine.

As described above, these measurements can be accumulated and, if necessary, stored by components of the estimator 14 of the detection apparatus 12. If necessary, it is possible to send the measurements via a communication network 26 to a central data processor unit 38 where the condition of components in the wind turbine 1 can be read or stored. The central data processor unit 38 may be placed inside or outside one of the pluralities of wind turbines or in a building away from the wind turbines.

The estimator 14 in the detection apparatus 12 may e.g. comprise a communication unit which communicates through a communication network e.g. the actual condition of components in the wind turbine 1, e.g. a receptor 6, accumulated data, estimated time to replacement of components in the wind turbine 1 and other data required to be displayed by the system to e.g. other wind turbines, wind power parks or central data processing units.

The central data processing unit may e.g. be a computer system located in a monitoring office where the means for interfacing communicates the condition of components in the wind turbine, e.g. at a predefined time or if a person in the monitoring office asks for this knowledge. This is very advantageous because a field engineer does not have to go to maintain a wind turbine unless some components have to be maintained.

FIG. 9 illustrates a block diagram of communication between pluralities of wind power parks (WPP; Wind Power Park) over a network 26 to a central data processing unit 38. Each single WPP (WPP1, WPP2, WPP3, . . . , WPP . . . ) comprises a plurality of wind turbines WT measuring current induced by lightning as described under FIG. 8.

The individual WPP may comprise one or more central data processing units 38, one or more detection apparatuses 12, or any combination thereof.

The measured data is sent to the network 26 e.g. by components of the estimator 14 of the detection apparatus 12 installed in each single wind turbine WT in the wind power park WPP as illustrated in WPP3 and WPPn.

In another embodiment of the invention, the measured data is sent to the network 26 from a central data processing unit 38 in the wind power park as illustrated in WPP1 and WPP2. The central data processing unit 38 can be placed inside or outside the wind power park or in a central building away from the wind turbine.

Different measurement methods may be applied within the scope of the invention. Three non-limiting examples will be mentioned below.

Current induced by lightning may e.g. be measured by means of a charge measurement apparatus based on a Rogowski coil.

The Rogowski coil is an electrical device which e.g. is used for measuring alternating current or high-speed current pulses. It consists of a helical coil wrapped around the straight conductor whose current is to be measured.

Since a Rogowski coil has an air core rather than an iron core, it has a low inductance and can respond to fast-changing currents and because it has no iron core to saturate, it is highly linear even when subjected to large currents such as current from lightning. Another advantage from using the Rogowski coil is that when it is correctly formed with equally spaced windings, it is largely immune to electromagnetic interference.

A further and preferred implementation of a measuring apparatus within the scope of the invention is optical and based on the theory of the Faraday rotation. The Faraday Effects used in fiber optic magnetic field sensing is a magnetically induced circular birefringence. For diamagnetic and paramagnetic materials a linearly polarized light travelling in the direction of a magnetic field experiences a net rotation. All crystalline materials exhibit the Faraday Effect but its magnitude varies considerably and may be enhanced by choosing a sensing element with a large Verdet constant (constant of the magneto optic material). Fibers with a large Verdet constant exist but a long propagation path is then necessary to obtain measurable effects.

Depending on the applied optical materials, two different configurations based on the Faraday Effect are available.

One solution works with an optical fiber wound around the conductor. To achieve a high signal-to-noise ratio in the output signal, several turns of the sensing fiber around the current-carrying wire are needed, and different optical paths and light rotation detection methods are used to eliminate external effects.

Another configuration works with optically transparent ferromagnetic crystalline materials featuring a large Verdet constant and hence enhanced sensitivity is obtained due to an increased rotation angle per length. However, due to the complexity and material dependency of the Faraday Effect in ferromagnetic materials, the effect in such materials is not linearly related to the magnetic field.

Figure 10A:
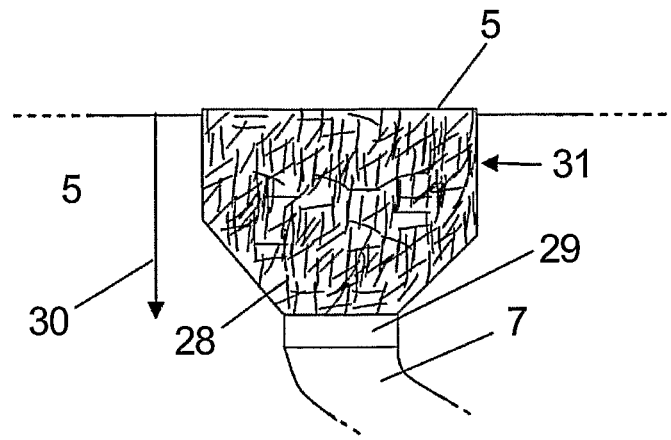

FIG. 10A schematically illustrate a lightning receptor 6 arranged in the rotor blade 5. As schematically indicated by the plurality of carbon nano tubes 28, the material of the lightning receptor is of a carbon nanotube metal composite material. In general, however, only a part of the lightning receptor may be of a carbon nanotube metal composite material. For example, an upper part may be of a carbon nanotube metal composite material, whereas the lower part may be of a standard light receptor material, such as a metal or metal alloy. In general, the part comprising carbon nanotube metal composite material may be the part facing the exterior of the wind turbine rotor blade.

The receptor is schematically illustrated as being connected to a down-conductor 7 for leading away any currents from a lightning strike. The lightning receptor may be connected to a down-conductor in any suitable way. Moreover, the lightning receptor may be fixed in the rotor blade by any suitable means. In an embodiment, the lightning receptor is secured in a holder unit 29.

The carbon nanotubes may be substantially homogeneously distributed in the receptor, and the carbon nanotubes may be substantially randomly oriented in the entire thickness 30 of the receptor. In the illustrated embodiment, at least a portion of the carbon nanotubes are in physical contact with each other 31.

The scope of the embodiment is not limited to the embodiment shown in the Figure. Typically homogeneously distributed carbon nanotubes are preferred over inhomogeneously distributed carbon nanotubes. The homogeneity is typically across the entire size of the receptor, thus at small size-scale, small compared to the size of the receptor, the distribution of the carbon nanotubes may be somewhat inhomogeneous. In general, the carbon nanotubes need not be randomly oriented and need not be in physical contact with each other. Orienting the nanotubes, e.g. along the direction along the thickness 30 of the receptor, however may improve the material properties of the receptor even further.

Carbon nanotubes may be provided with a large variety of lengths. In different embodiments, the carbon nanotubes may be of different lengths, as well as a given carbon nanotube metal composite may be provided with carbon nanotubes exhibiting a length distribution.

Figure 10B:
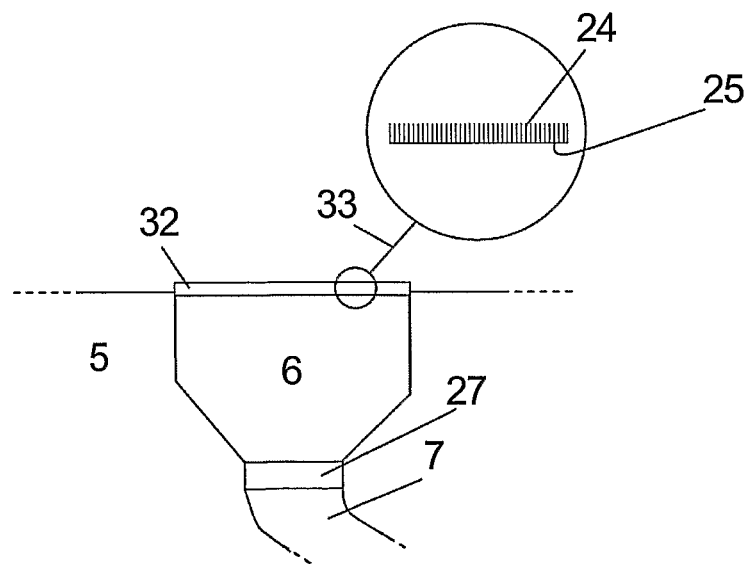

FIG. 10B schematically illustrate a further embodiment of a lightning receptor 6 arranged in the rotor blade 5. The lightning receptor is at an exterior surface provided with a layer 32 of carbon nanotubes. The insert 33 schematically illustrates an enlargement of the layer 32, where the enlargement schematically illustrates individual carbon nanotubes 34 protruding from the exterior surface 35 of the lightning receptor.

The receptor is schematically illustrated as being connected to a down-conductor 7 for leading away any induced currents from a lightning strike. The lightning receptor may be connected to a down-conductor in any suitable way. Moreover, the lightning receptor may be fixed in the rotor blade by any suitable means. In an embodiment, the lightning receptor is secured in a holder unit 29.

Figure 11:
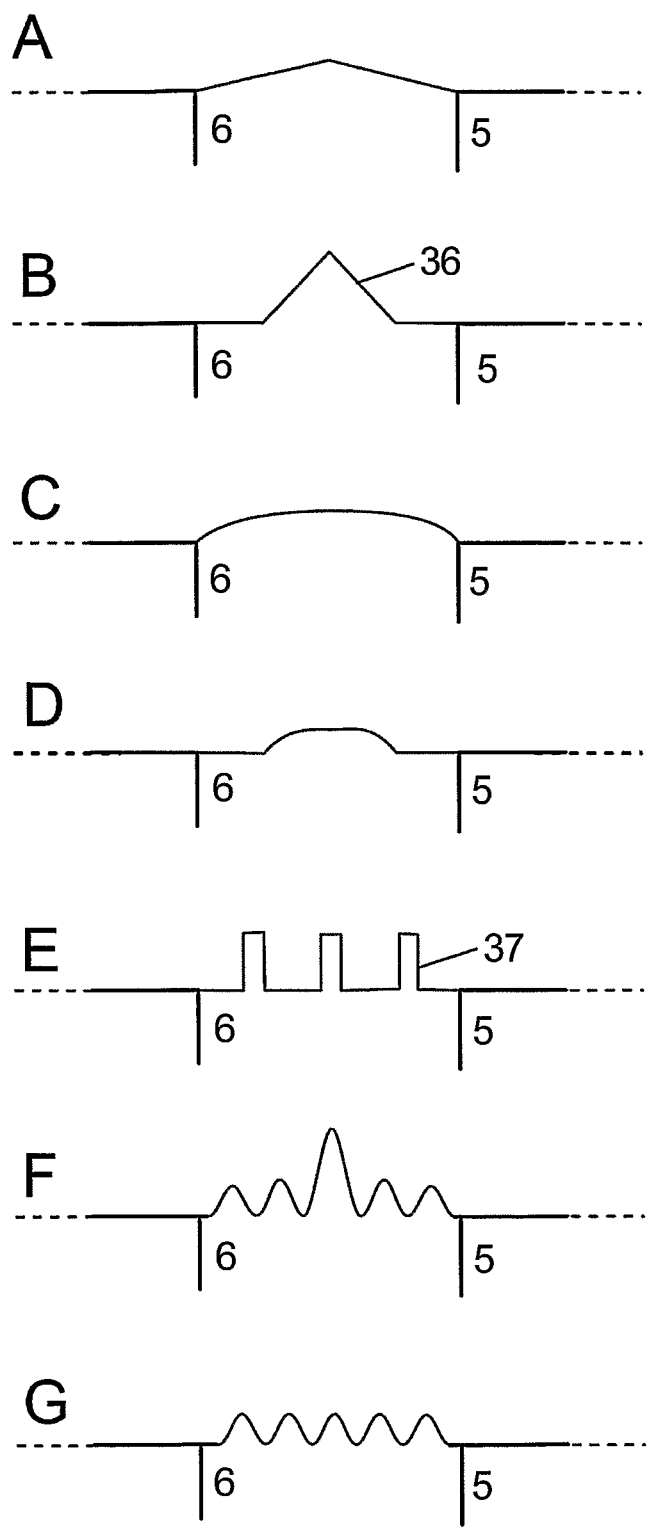

FIG. 11 schematically illustrates in cross-sectional view, a number of embodiments of receptors 6 arranged in a rotor blade 5, where the exterior surface of the receptors is provided with one or more field enhancing protrusions. The scope of the invention is not limited to the embodiments shown in the Figure, any type of field enhancing protrusions within the scope of the invention is possible. Moreover, the schematic illustrations are not accurate representations in the sense of engineer or technical drawings. The illustrations are merely provided in order to illustrate various features of embodiments of the present invention. The illustrated embodiments provide examples of specific field enhancing protrusions.

In the exemplary embodiment as shown in FIG. 11A, a single centrally placed tip-shaped field enhancing protrusion is illustrated, the tip-shaped protrusion is pointing generally outwards from the exterior surface and is extending the entire exterior surface.

In the exemplary embodiment as shown in FIG. 11B, a single centrally placed tip-shaped field enhancing protrusion is illustrated, the tip-shaped protrusion is pointing generally outwards from the exterior surface and is extending a central part of the exterior surface.

In FIGS. 11A and 11B the rising surface 36 of the protrusion is illustrated to be a straight or plane surface. Other embodiments include, but are not limited to, concave or convex rising surfaces.

In the exemplary embodiment as shown in FIG. 11C, a single centrally placed arc-shaped field enhancing protrusion is illustrated, the arc-shaped protrusion is protruding generally outwards from the exterior surface and is extending the entire exterior surface.

In the exemplary embodiment as shown in FIG. 11D, a single centrally placed arc-shaped field enhancing protrusion is illustrated, the arc-shaped protrusion is protruding generally outward from the exterior surface and is protrusion is extending a central part of the exterior surface.

In FIGS. 11C and D the curvature of the exterior surface of the field enhancing protrusions are illustrated to be rather low. Other embodiments include, but are not limited to, hemispherical shaped field enhancing protrusions.

In the exemplary embodiment as shown in FIG. 11E, three distributed cylinder shaped field enhancing protrusion are illustrated.

In FIG. 11E the rising surface 37 may also be provided with an angle in order to provide protrusion having a truncated cone shape. Moreover, the rising surface, especially in the truncated cone embodiment, may be of a concave or convex rising shape.

In the exemplary embodiments as shown in FIGS. 11F and 11G the one or more field enhancing protrusions constitute a generally wave-shaped exterior surface. The waveshape may e.g. be circularly symmetric around a centre point, i.e. the field enhancing protrusions may be build up of a central crest and two concentric crests.

In FIG. 11F, the central wave-formed protrusion comprises a larger amplitude than the wave-formed protrusion position away from the centre. In FIG. 11G, all the wave-formed protrusions comprise the same amplitude.

In FIGS. 11A to 11G different numbers of protrusion are illustrated, it is however to be understood, that any number of protrusions may be provided in any of the illustrated embodiments.

In exemplary embodiments, the size of the lightning receptor may be in the centimeter (cm) range, such as possessing a diameter or other relevant width in the range of 0.5 to 5 cm, such as 1.5 cm.

In exemplary embodiments, the height of the field enhancing protrusions may be in the range between some millimeter (mm) to a few centimeters, such as a between 1 mm to 10 mm, or larger.

In relation to the above mentioned embodiments the down-conductor 7 is preferably located in the interior of the blade 5. Furthermore it is obvious that a person skilled in the art is able to combine one or more of the above mentioned embodiments to receive at an embodiment, which is optimal for a problem to be solved.

Down conducting system 30
Wind Power Park WPP
Wind turbine 1, WT
Tower 2
Nacelle 3

Hub 4
Rotor blades 5
Receptor 6
Down Conductor 7
Lightning 8
First lightning current transfer unit 9A
Second lightning current transfer unit 9B
Ground connection 10
PE-wire 11
Detection apparatus 12
Charge measurement apparatus 13
Estimator 14
Damaged part of a receptor 15
Crack 16
Pole 17
Wind turbine 18
Charge originating from lightning is determined 19
Charge originating from lightning is accumulated 20
Accumulated charge is compared 21
Measurement level 1 22
Measurement level 2 23
Measurement level 3 24
Central data processing unit 38
Communication network 26
Thread 27
Carbon nanotube 28
Holder unit 29
Thickness of receptor 30
Nanotubes in physical contact 31
Layer of nanotubes 32
Insert 33
Individual carbon nanotubes 34
Exterior surface of the receptor 35
Rising surface 36
Rising surface 37

The invention claimed is:

1. A detection apparatus of a wind turbine, the detection apparatus comprising:
   a down-conducting system configured to conduct current induced by lightning;
   a charge measurement apparatus coupled with the down-conducting system and configured to generate a charge representation representing an amount of charge induced into the down-conducting system by a lightning strike; and
   an estimator configured to:
      accumulate a plurality of charge representations corresponding to a plurality of lightning strikes;
      estimate lightning-induced deterioration of one or more components of the wind turbine based on the accumulation of the charge representations; and
      predict a service life of at least one of the one or more components based on the estimated lightning-induced deterioration.

2. The detection apparatus of claim 1, wherein the one or more components forms at least a part of the down-conducting system.

3. The detection apparatus of claim 1, wherein the one or more components comprises at least one of a receptor and a lightning current transfer unit.

4. The detection apparatus of claim 1, wherein the charge measurement apparatus measures the current fed through the down-conducting system as a result of lightning.

5. The detection apparatus of claim 1, wherein the charge measurement apparatus comprises at least one optical measurement apparatus.

6. The detection apparatus of claim 1, wherein the charge measurement apparatus comprises at least one Rogowski coil.

7. The detection apparatus of claim 1, wherein the estimator comprises at least one of a data processing unit for data processing and treatment of analogue or digital measure results, a data storage, a display, and a communications interface.

8. The detection apparatus of claim 7, wherein the stored data is compared with predefined critical deterioration values of the one or more components in connection with the wind turbine to indicate at least two maintenance levels of the one or more components in connection with the wind turbine.

9. The detection apparatus of claim 8, wherein the stored data represents an accumulation of the charge representations for a plurality of lightning strikes.

10. The detection apparatus of claim 9, wherein the estimator is configured to estimate the lightning-induced deterioration of the one or more components in the wind turbine by:
    comparing the stored data to a first pre-stored value and a second pre-stored value greater than the first pre-stored value;
    in response to the stored data being less than the first pre-stored value, determining that no action is required;
    in response to the stored data being greater than the first pre-stored value but less than the second pre-stored value, issuing a predictive request for maintenance; and
    in response to the stored data being greater than the second pre-stored value, issuing an immediate request for maintenance.

11. The detection apparatus of claim 8, wherein the one or more components include a first component and a second component, and the at least two maintenance levels of the one or more components are defined by different maintenance levels for the first component and the second component.

12. The detection apparatus of claim 7, wherein the display is capable of displaying all data handled by the detection apparatus and the charge measurement apparatus.

13. The detection apparatus of claim 7, wherein the communications interface communicates the condition of at least one component in connection with the wind turbine to a central data processing device.

14. The wind turbine of claim 1, wherein the first component is a blade of the wind turbine, and wherein the down-conducting system is disposed within the blade.

15. The wind turbine of claim 14, wherein the charge measurement apparatus is disposed within the blade.

16. A method for predicting a service life of a component of a wind turbine or of a wind power plant including the wind turbine, the method comprising:
    determining, using a charge measurement apparatus coupled with a down-conducting system of the wind turbine, a charge induced into the component by a lightning strike;
    determining, using an estimator coupled with the charge measurement apparatus, an accumulated charge from a plurality of determined charges corresponding to a plurality of lightning strikes;
    relating, using the estimator, the accumulated charge to a degree of lightning-induced deterioration of the component; and
    predicting, using the estimator, a service life of the component based on the degree of lightning-induced deterioration.

17. The method of claim 16, wherein the component comprises at least one of a receptor and a lightning current transfer unit.

18. The method of claim 16, wherein determining the charge induced into the component comprises measuring current induced by the lightning strike and fed through the down-conducting system, and integrating the measured current with respect to time.

19. A wind turbine comprising:
at least a first component;
a down-conducting system disposed within the first component and configured to conduct current induced by lightning;
a charge measurement apparatus coupled with the down-conducting system and configured to generate a charge representation representing an amount of charge induced into the down-conducting system by a lightning strike; and
an estimator configured to:
  accumulate a plurality of charge representations corresponding to a plurality of lightning strikes;
  estimate lightning-induced deterioration of the first component based on the accumulation of the charge representations; and
  predict a service life of the first component based on the estimated lightning-induced deterioration.

20. The wind turbine of claim 19, wherein the charge measurement apparatus and the estimator are disposed within a tower of the wind turbine.

21. The wind turbine of claim 19, wherein the charge measurement apparatus and the estimator are disposed within a same housing within a component of the wind turbine.

* * * * *